March 11, 1930.  G. H. GILMAN  1,750,316
MATERIAL HANDLING APPARATUS
Original Filed Dec. 3, 1921   8 Sheets-Sheet 3

Inventor:
George H. Gilman.
by Emery Booth, Janney & Varney
Attys.

March 11, 1930. G. H. GILMAN 1,750,316
MATERIAL HANDLING APPARATUS
Original Filed Dec. 3, 1921   8 Sheets-Sheet 4

Inventor:
George H. Gilman.
by Emery Booth Janney & Varney
Attys.

March 11, 1930.   G. H. GILMAN   1,750,316
MATERIAL HANDLING APPARATUS
Original Filed Dec. 3, 1921   8 Sheets-Sheet 6

Patented Mar. 11, 1930

1,750,316

UNITED STATES PATENT OFFICE

GEORGE H. GILMAN, OF BELMONT, MASSACHUSETTS

MATERIAL-HANDLING APPARATUS

Application filed December 3, 1921, Serial No. 519,634. Renewed August 2, 1929.

My invention relates to material handling apparatus and particularly but not exclusively to a mucking machine.

My invention will be best understood from the following description when read in light of the accompanying drawings of a specific embodiment of my invention selected for illustrative purposes, while the scope of my invention will be more particularly pointed out in the appended claims.

In the drawings,

Figs. 6, 7, 8 and 9 are sections on the lines 6—6, 7—7, 8—8 and 9—9 of Fig. 1;

Referring particularly to Figs. 1 to 7 of the drawings which show the embodiment selected for illustrating my invention, I have provided a shovel 1 rigidly secured to an intermediate portion of the pair of shovel arms 3. These arms are carried by a shaft 5, which also supports the oppositely disposed segmental gear wheels 7. These parts are so arranged, as for example by fixing the gear wheels to the adjacent shovel arms and securing the wheels by means of cotter pins 9 to the shaft, that when the gears are turned, they are effective to swing the shovel.

For operating the shovel I provide a cylinder 11 in which is mounted for reciprocation a piston 13, the latter being provided with a chamber 15, in which is mounted for reciprocation a piston 17. The pistons 13 and 17 respectively are provided with heads 19 and 21 which make a fluid-tight joint with the walls of their respective piston chambers. The rearward end of the cylinder 11 is closed by a head 23 and the forward end of the chamber 15 by means of a head 25, the latter being provided with a packing of any suitable kind for making a fluid-tight joint with the piston 17. The front cylinder head 27 of the cylinder 11 is integrally formed with said cylinder and by means of suitable packing makes a fluid-tight joint with the exterior of the piston 13. For affording additional support for the piston 13 I provide the cylinder 11 with an extension which has formed therewith the saddle bearing or guide 28 for said piston.

It will be noted that the piston 13 is itself a cylinder and that I have formed by the organization just described a plurality of nested rams by arranging the cylinders and pistons of the same concentrically.

The shaft 5 is supported by means of spaced lugs 29, which lugs are carried by the front cylinder head 25 and abut the inner sides of the arms 3.

At opposite sides of the machine I provide racks 31, each of which meshes with the gear wheel 7 at that side of the machine and is carried in the groove 33 formed in the side of the cylinder 11, the racks being retained in the grooves by means of the covers 35, bolted to the cylinder so as to cover the grooves. Providing a support for the racks to take up the thrust of the gear wheels 7 I cause each rack to rest on a bracket 36 carried by the cylinder member 11. The racks are connected to each other and to the piston 17 by means of a yoke 37, which also carries rollers 38 for cooperation with the cam tracks 39 afforded by the sides of the arms opposite the shovel. Each rack is provided with a longitudinally extending slot 40 through which extends a pin 41 rigidly carried by a cylinder member 11. The length of the slot 40 is such as to prevent the rack and the piston 17 from moving outwardly from their initial position a distance greater than the length of the stroke of the piston 17 as determined by its chamber 15.

On the cylinder 11 in the path of each of the arms 3 I mount buffer plates 41 which are backed by the compression springs 42. The arms I provide with brackets 43 which afford flat surfaces 45 for contacting the buffer plates when the parts are in the position shown by Fig. 1.

Figure 4:
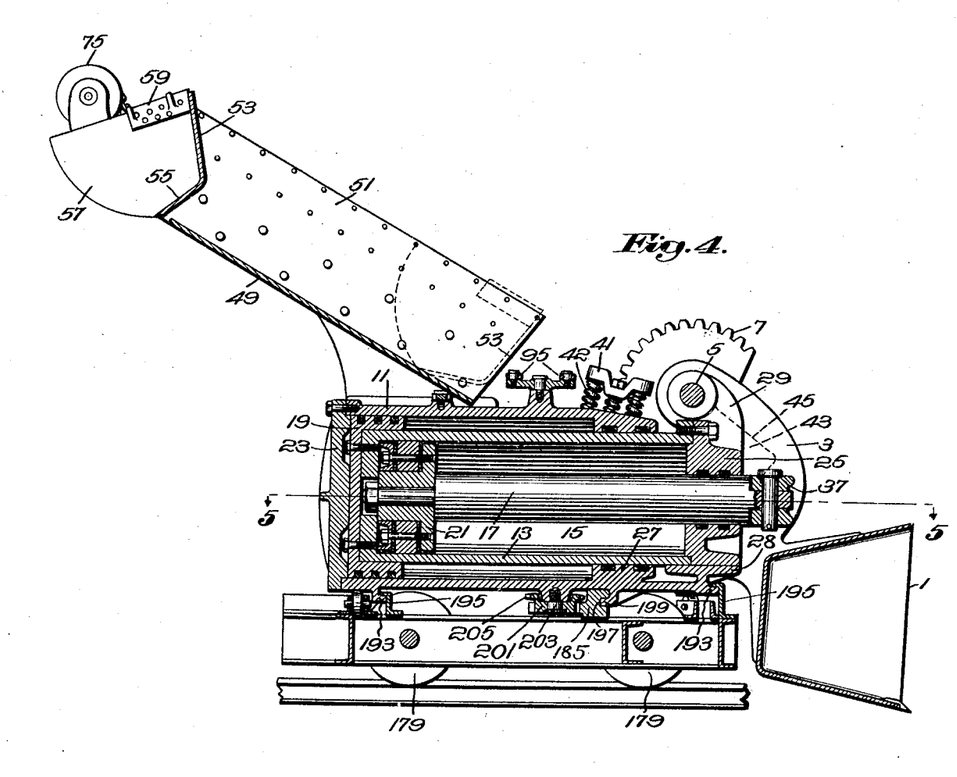
Fig. 4 is a section on the line 4—4 of Fig. 3.
Figure 5:
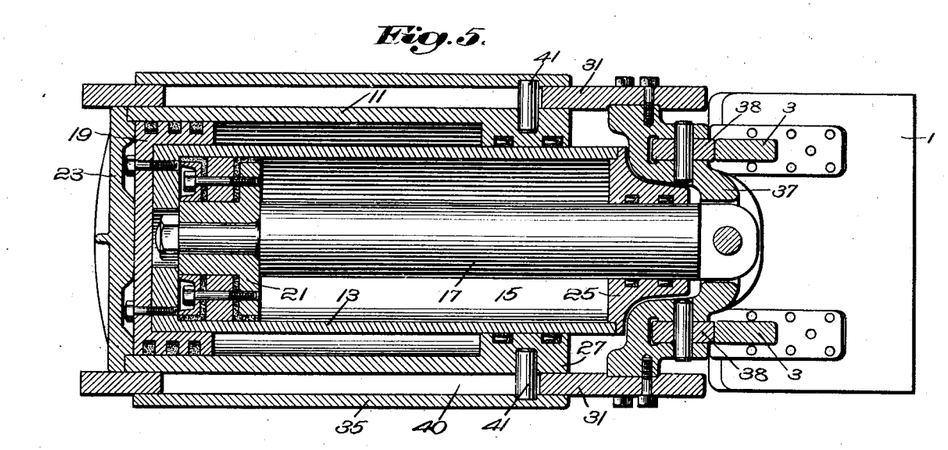
Fig. 5 is a section on the line 5—5 of Fig. 4.
Figures 6, 8:
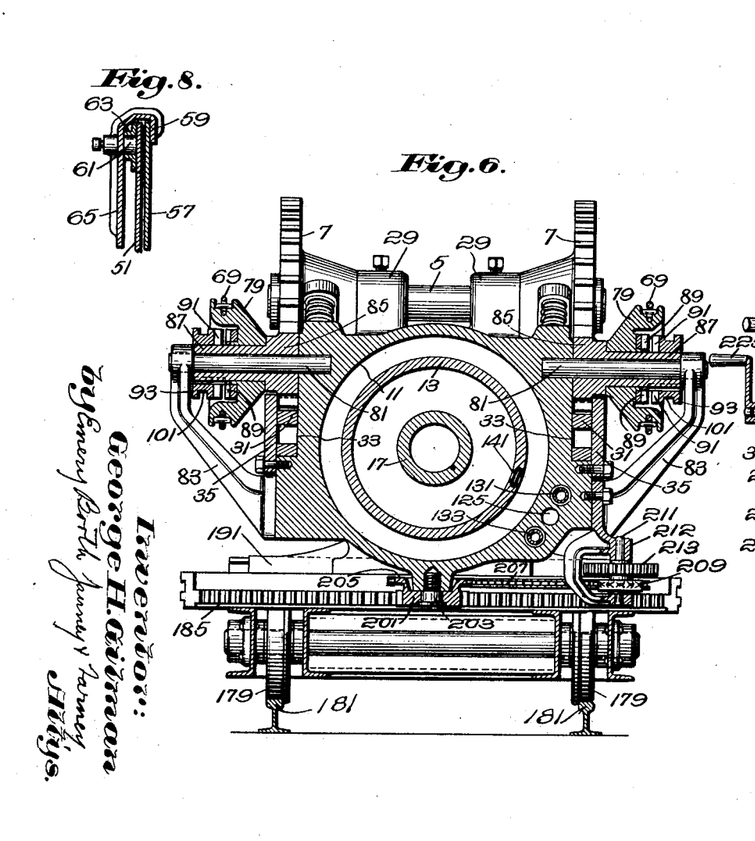
Figure 9:
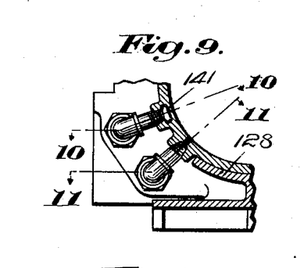
Figure 10:
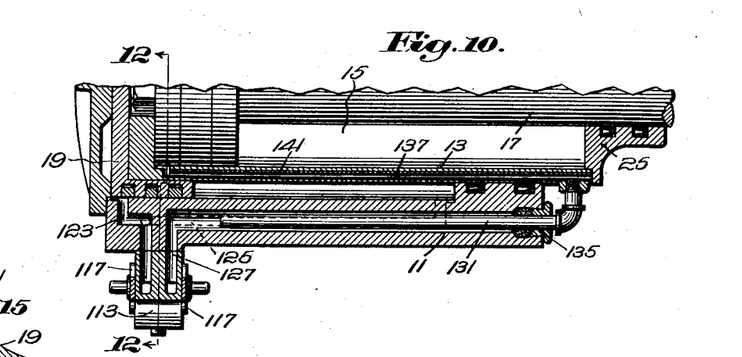
Figs. 10 and 11 are sections on the lines 10—10 and 11—11 of Fig. 9.

To the opposite sides of the cylinder 11 are bolted the upwardly inclined, rearwardly extending arms 47. Between these arms, supported thereby and secured thereto by riveting or otherwise, is an open ended trough, having the bottom 49 and sides 51 and affording a hopper for the material handled by the shovel. Mounted for reciprocation in the trough is a scoop having a back wall 53, which is provided with a portion 55 adapted to scrape against the bottom wall 49 of the trough. The scoop is also provided with the side walls 57, which conform to the sides of the trough, and which, starting at the scraper edge afforded by the portion 55 of the scoop flare outwardly and upwardly to provide the extended sides of the scoop as is illustrated in Fig. 4.

For supporting the scoop I attach to the upper portion of each side wall thereof a channel-shaped member 59 which is placed over the top of the side wall of the trough. Each member 59 carries a pin 61 which fits into a groove afforded by the slotted member 63, the latter being carried on the side walls of the trough and longitudinally thereof just below the top. Each member 59 is also provided with the downwardly extending arm 65, which when the scoop is in the position of parts illustrated by Fig. 2, contacts with a stop 67. Chains 69, opposite ends of which are secured at points 71 to the members 59, serve to move the scoop back and forth through the trough. When the scoop has been moved upwardly to the position shown by Fig. 2, the lower end of the arm 65 has been brought into contact with the stop and prevented from moving further toward the top of the trough while the chain has given the upper portion of the member 59 continued movement, which serves to tilt the scoop about its lower edge and dump the contents of the scoop out of the trough.

It will be noted that by means of the trough and scoop I have provided a material conveyor effective to move the material placed in the trough by the shovel, rearwardly and upwardly, and thus cause said material to fall rearwardly of the machine. In practice a mine car will be placed under the trough and the material will be thus elevated and discharged into said car.

Each chain 69 is carried over the chain-wheel 75, the latter being supported on the adjustable bracket 77 carried by the arms 47 and over a chain-wheel 79, which is rotated by means of the rack 31. To this end I provide at opposite sides of the machine shafts 81, the inner ends of which are supported by the cylinder 11 and the outer ends by brackets 83 carried by said cylinder member. Mounted for rotation on the shafts are gear wheels 85 which mesh with the racks 31. These gear wheels are provided with hubs 87, on which the chain-wheels 79 are rotatively mounted. The hub portion of the chain-wheels are provided with jaws 89, which are adapted to mesh with the jaws 91 of the disks 93, the latter being splined to the hub 87. As will be obvious, when the disks 93 are moved toward the chain-wheels so as to engage the respective jaws of each, the chain-wheel is locked for rotation with the gear wheel, which causes the scoop to reciprocate when the rack reciprocates, or in other words, when the shovel is operated. When these jaws are disengaged, the shovel may be operated without the scoop being actuated and this allows me to place several shovel loads of material into the trough before removing said material.

For operating the clutches above described, I pivot at the upper portion of the cylinder a double bell crank lever 94, to which are connected the ends of the links 95, the other ends of the links being connected to the reciprocatory shipper rods 97. The shipper rods are supported in hollow sleeves 98 carried by the cylinder 11 and carry at their outer ends the forked arms 99 which engage the grooves 101 of the disks 93. For turning the bell crank I provide a lever 105, an intermediate portion of which is connected by means of a link 107 to an arm of the bell crank lever while its end is pivoted at 109 to the upper portion of the cylinder. The handle portion 111 of the lever 105 projects through suitable slots in the arms 47 and is disposed at the exterior of the machine. It will be appreciated by this construction that both clutches will be thrown into and out of engagement simultaneously.

For operating the rams provided by the cylinder and piston members 11, 13 and 17 I provide a valve casing 113, which is bolted to the side of the cylinder member 11 adjacent the rearward end of the machine and close to the handle 111 of the clutch operating mechanism. To this casing is connected at 115 in any suitable manner a conduit 116 for conveying motive fluid, preferably compressed air, for actuating the rams. The valve casing is provided with a bore which receives the oppositely arranged sleeves 117, which are provided with frusto-conical seats for receiving the frusto-conical valves 119 and 121. The valve 121 controls the admission and exhaust of motive fluid to opposite ends of the chamber 15 receiving the piston 17, while the valve 119 controls the admission and exhaust to opposite ends of the cylinder 11. The me tive fluid is admitted from the conduit 116 to the space 122 between the valves and acts to hold the same to their seats.

Figure 11:
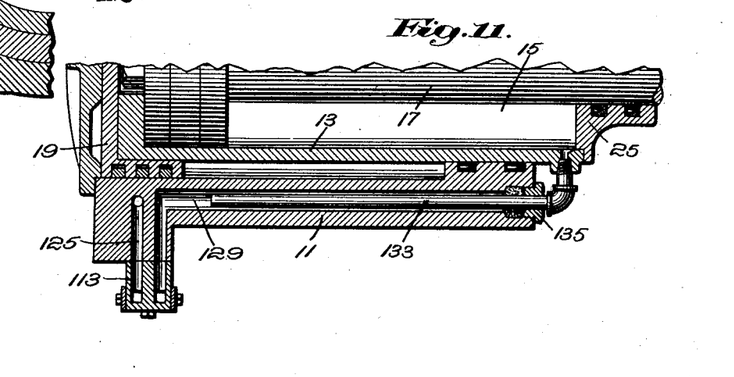
Figure 12:
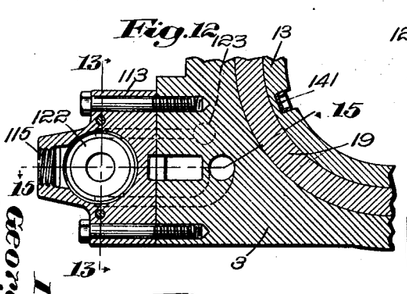
Fig. 12 is a section on the line 12—12 of Fig. 10.

Leading from diametrically opposite points on the seat for the valve 119 are passages 123 and 125 respectively provided for communication with the rearward and forward ends of the cylinder 11, while leading from diametrically opposite points on the seat for the valve 121 are passages 127 and 129 respectively provided for communication with the rearward and forward ends of the chamber 15 for the piston 17. The passages 127 and 129 open through the front end wall of the cylinder member 11 and respectively receive pipes 131 and 133, the stuffing boxes 135 making a fluid-tight slip joint between the pipes and the conduits afforded by the passages 127 and 129. The pipe 133 opens directly into the forward end of the chamber 15 as is illustrated by Fig. 11, while the pipe 131 opens into a conduit 137 which extends longitudinally of the cylinder 13 through the wall thereof and opens into the rearward end of the chamber 15.

The conduit 137 is provided by a flattened pipe 141 which is positioned in the mould in which the cylinder member 13 is cast so as to be surrounded by the metal forming the wall of said cylinder. By this means I am able to make the cylinder 13 of thin-walled construction and at the same time the conduit 137 of sufficient cross-sectional area to carry the requisite amount of motive fluid.

Figure 13:
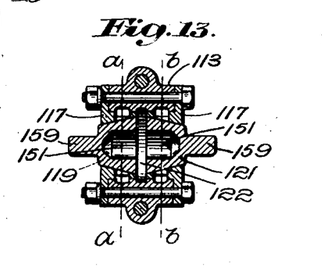
Fig. 13 is a section on the line 13—13 of Fig. 12.
Figure 14:
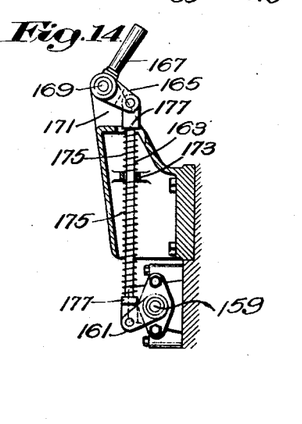
Fig. 14 is a section on the line 14—14 of Fig. 1.
Figure 15:
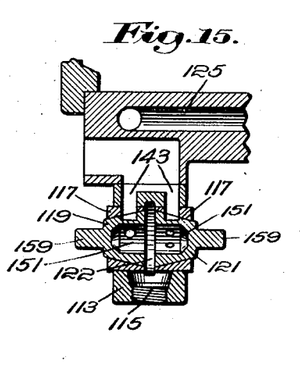
Fig. 15 is a section on the line 15—15 of Fig. 12.
Figure 16:
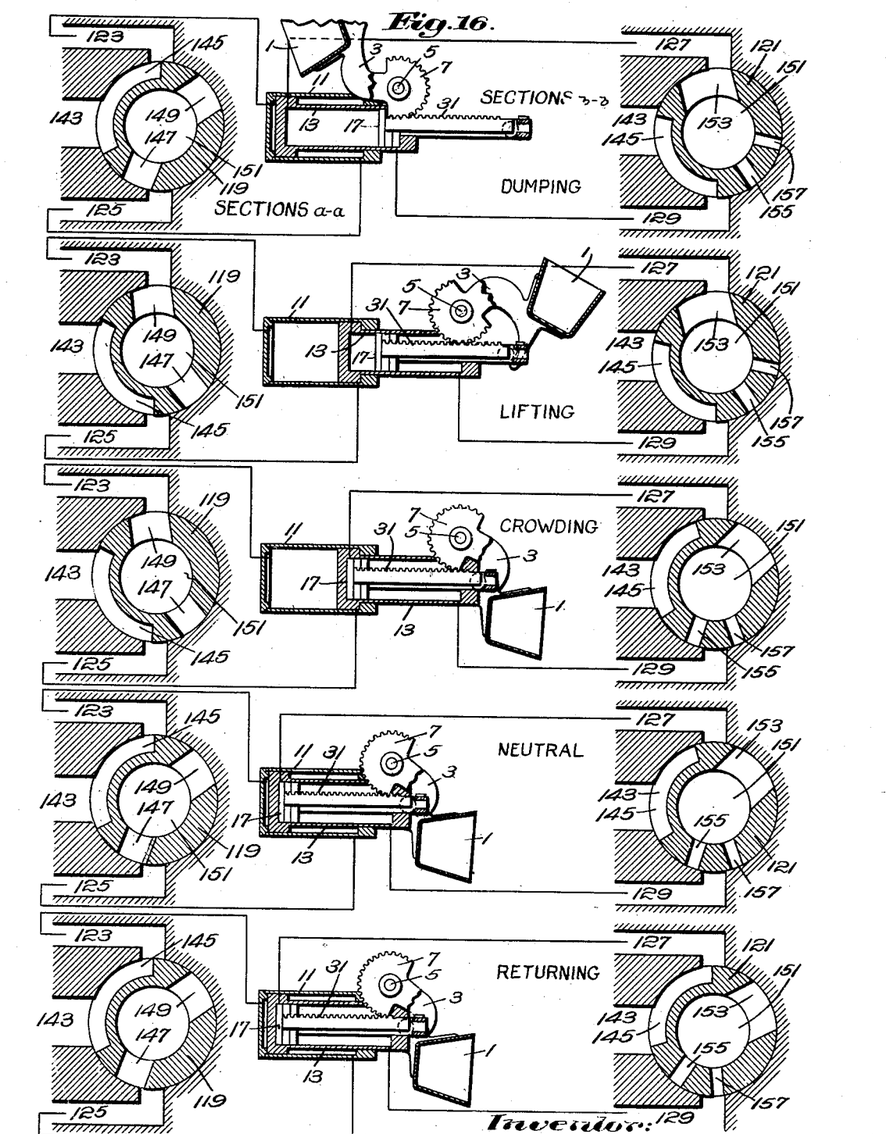
Fig. 16 is a diagram showing the operation of the controlling valve.

The arrangement and location of ports in the valve are best illustrated by Fig. 16, in which the valves are shown in their various positions and in sections corresponding to the lines $a$—$a$ and $b$—$b$ of Fig. 13.

Referring particularly to Fig. 16 and to the valves 119 and 121, intermediate the points of communication with the valve seats of the passages leading to the respective cylinders I open into said seats passages 143 for conducting the spent motive fluid to the atmosphere. For connecting each of said passages leading from the cylinder ends to said passage 143, I provide each valve on its exterior surface with an arcuate groove 145. The valve 119 is further provided with radial passages 147 and 149 leading from the interior conduit 151 of the valve to the surface thereof. The conduit 151 opens through the end of the valve adjacent the motive fluid supply, while the passages 147 and 149 are so arranged that each may be connected to the end of the cylinder while the other is blanked, or both may be connected to supply the ends of the cylinder contemporaneously, while the passage 145 is so arranged that when one passage alone is connected to supply the end of the cylinder the other passage will be connected to the atmosphere.

The valve 121 is provided with a radial passage 153 for supplying air to the passage 127, and is further provided with a pair of radial passages 155 and 157 for supplying air to the passage 129.

For operating the valves I provide each with a stem 159, to which are secured arms 161, the latter being pivoted at their opposite ends to links 163 and the links being pivoted to the ends of arms 165 which are formed integrally with the hand levers 167. The hand levers are pivotally carried on a shaft or pin 169 supported in a bracket 171 bolted to the side of the cylinder member 11. On the bracket I form a guide lug 173 which is perforated to loosely receive the links 163. Surrounding the links are the compression spring 175, each abutting at one end the lug 173 and at their other the shoulders 177 on the links. These springs serve to hold the valve 121 in the neutral position illustrated by Fig. 16, which is an intermediate position of the valve. On the link 163 for the valve 119 the upper spring is omitted, which will hold the valve in its neutral position as illustrated in Fig. 16 and which position is an extreme position of said valve. By this construction, as will be obvious, when the operator removes his hand from the handle 167, the valves will return to their neutral position.

The operation of the parts of my device so far described is as follows:—

Referring particularly to Fig. 16, in which the controlling valves are indicated in section, and in which the rams, the racks, the gear wheels, the shovel arms and shovel are indicated diagrammatically, it will be noticed if starting from the "Neutral" position, the valve 119 is moved to the position marked "Crowding", air will be admitted to the rearward end of the cylinder 11 while the forward end of said cylinder will be connected to the atmosphere. This will move the shovel forwardly without swinging, so as to crowd the shovel into the work.

If the valve 119 is held in the same position as before and the valve 121 is then moved to the position marked "Lifting", air will be admitted to the rearward end of the cylinder 13 while the forward end of said cylinder will be connected to the atmosphere. This will move the piston 17 and the connected rack 31 until the rearward end of the slot 43 of the rack is brought up against the pin 45 and will act to swing the arm 3 so as to lift the shovel. The piston 13, during the motion of the piston 17 as just described, will remain stationary at the outer end of its stroke owing to the admission of the motive fluid to the rear of the cylinder 11. During the lifting operation the rollers 39 force the arm to move and at the end of the operation are at the end of the arm. By depending on the rollers for this operation a greater leverage is availed of than is afforded by the rack and gear.

If the valve 121 at the end of the lifting operation is maintained in the same position and the valve 119 is moved to the position marked "Dumping", the rearward end of the cylinder 11 will be connected to the atmosphere while the forward end of said cylinder will be supplied with motive fluid and this will move the cylinder 13 rearwardly without the piston 17 moving. Under these conditions, the rack remains stationary while the gear 7 and arm 3, which are pivoted by means of the shaft 5 to the cylinder 13, are given a motion of translation rearwardly and this causes the gear to roll along the rack and to swing the shovel further and to dump the contents thereof into the hopper.

To return the shovel from the dumping position the valve 119 is allowed to remain in the same position, while the valve 121 is moved to the position marked "Returning" and thereby the cylinder 13 is maintained in position while the piston 17 is caused to move to the inward end of its travel, this, of course, moving the rack and causing the wheel 7 to turn the arm 3 in the contrary direction and carry the shovel to its lowermost position. The valve 121 is now released to cause it to move to its neutral position, which causes it to trap air in the forward end of the cylinder 13, which aids in holding the piston 17 at the rearward end of said cylinder when the shovel is again crowded.

Figures 1, 2:
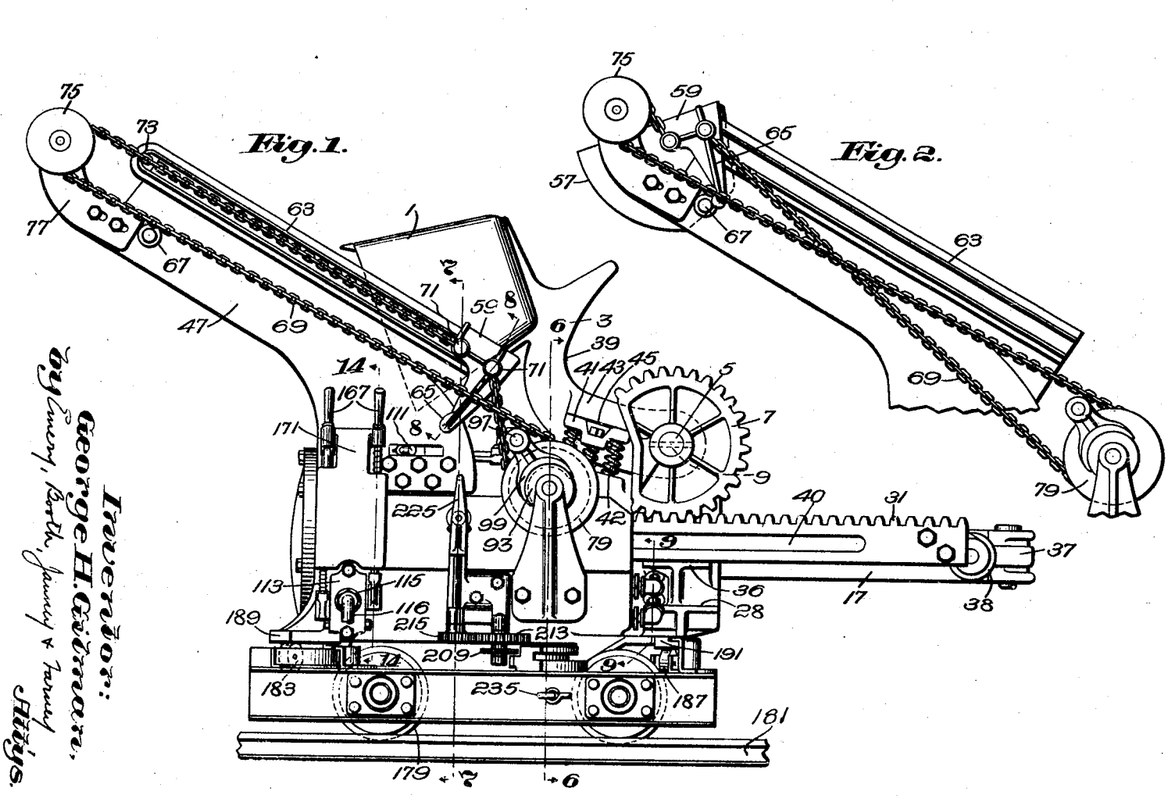
Fig. 1 is a side elevation of a mucking machine with the shovel in dumping position.
Fig. 2 is an elevation of a fragment of a machine with the scoop in dumping position.
Figure 2:
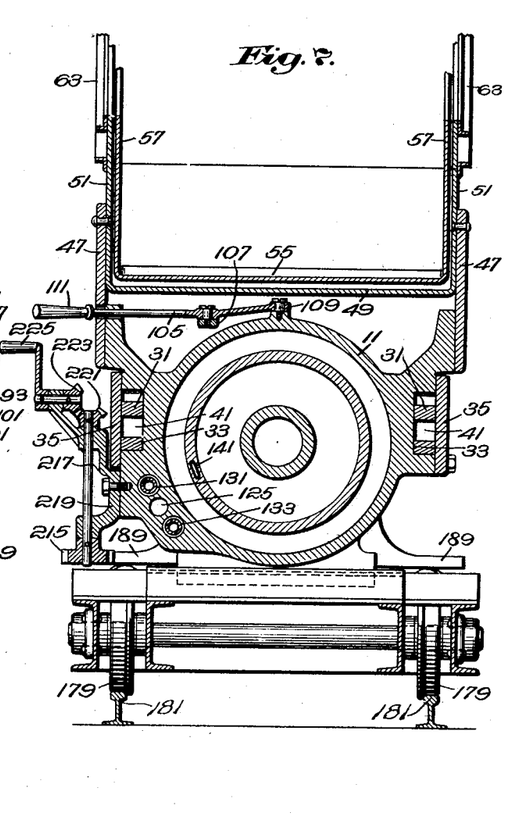
Figure 3:
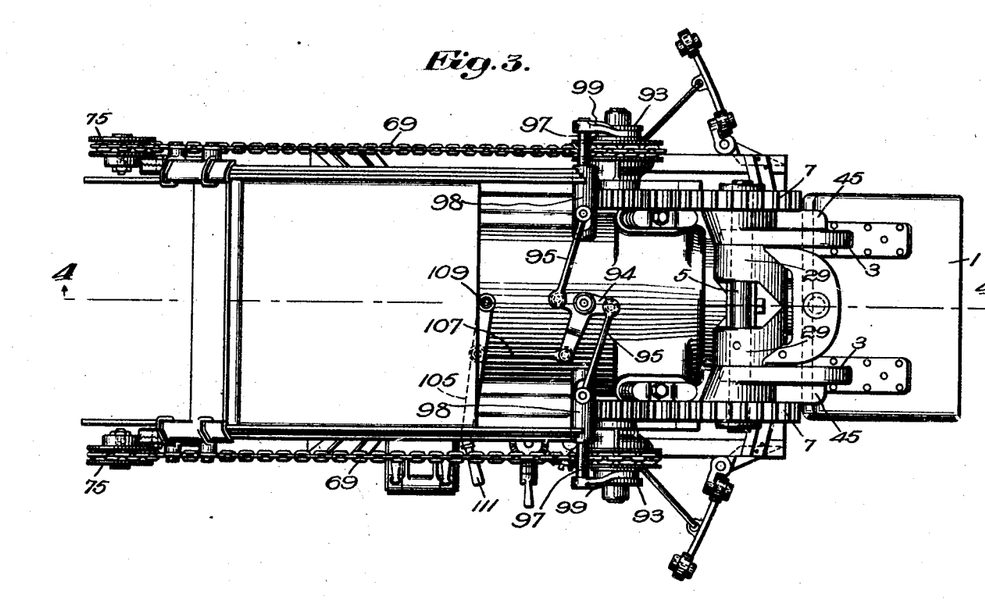
Fig. 3 is a plan view of the machine with the shovel in its initial position.

During the operations just described the scoop moves in consequence of movement of the rack, the parts being so timed that when the shovel dumps the scoop will be at its lower position as shown by Fig. 1 and will move upward and discharge the material when the shovel returns to its lowermost position.

The passage 155 of the valve is provided so that when the valve is moved from the position marked "Crowding" to the position marked "Lifting," air will be supplied simultaneously through the passages 127 and 129 respectively to the rearward and forward ends of the cylinder 13. This will start the piston 17 forwardly slowly due to the differential action of the motive fluid on the piston, and with light loads may be sufficient to lift the shovel. If this force is not sufficient to lift the shovel the valve can be moved to the position marked "Lifting" which will connect the forward end of the cylinder 13 to the atmosphere and thus increase the effective area on which the motive fluid is acting. It will also be noted that if at any time during the lifting, it is desired to check the speed of the shovel, the valve 121 may be moved counterclockwise from the position marked "Lifting" or from the other lifting position just described to the neutral position. The same is true when crowding the shovel, if the speed should be too great, said shovel may be checked by permitting or causing the valve 119 to move so as to admit motive fluid in advance of the piston 13. This latter may be done by moving the valve 119 slightly counterclockwise from the position marked "Crowding" so as to cause the passage 147 as well as the passage 149 to supply motive fluid to the cylinder. Under light loads this admission to both ends may be sufficient to crowd the shovel and by manipulating the valve to suitably restrict the supply to the forward end of the cylinder the speed of crowding may be regulated.

Figures 17, 18:
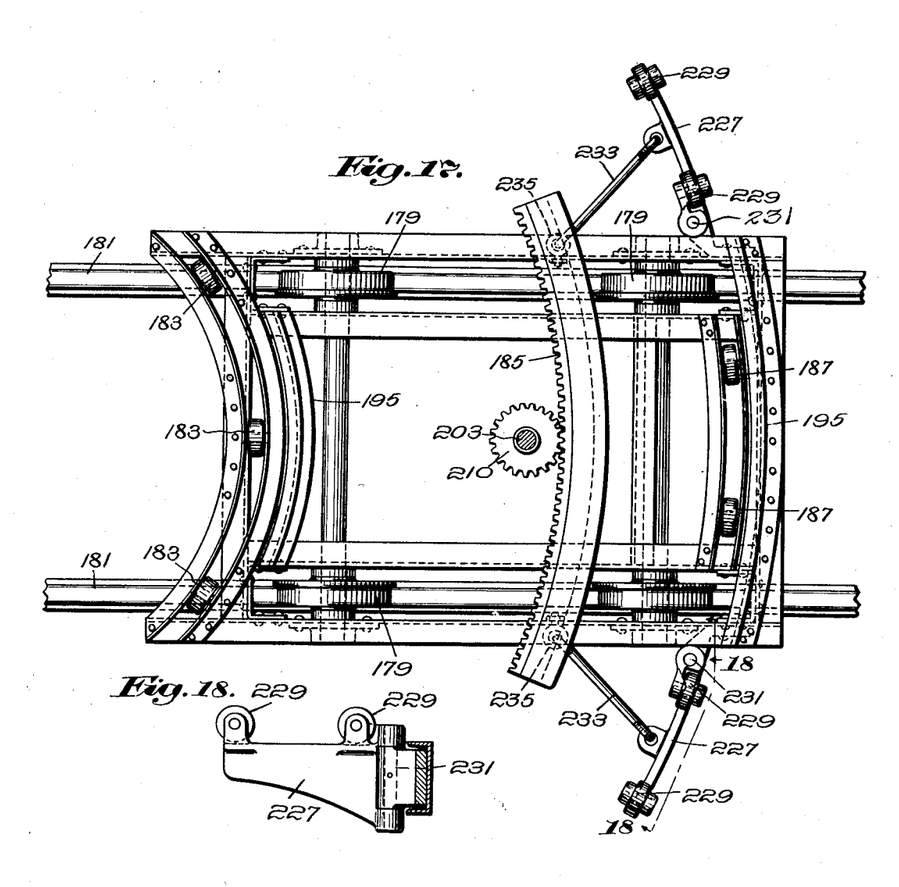
Fig. 17 is a plan view of a truck.
Fig. 18 is a section on the line 18—18 of Fig. 17.

I have shown the machine supported on a truck having the wheels 179 which rest on tracks 181. At the rearward end of the truck I provide a frame carrying the rollers 183 arranged in the arc of a circle, whose center is on the center line of the truck and under the rearward end of the trough. Concentrically with this circle I provide a segmental rack 185, and second set of rollers 187. At the rear of the cylinder 11 I provide extensions 189 which rest on the rollers 183 and at the forward end the shorter extensions 191 which rest on the rollers 187.

For holding the cylinder 11 to the truck and guiding it in its swinging motion I provide lugs forming arcuate guideways 193 concentric with the circle just mentioned and which interlock with the Z-bars 195. On the side of the rack 185 opposite the teeth thereof I provide a slot 197, which receives the arcuate lug 199 formed on the bottom of the cylinder 11, which construction serves to further guide the cylinder on the truck and to insure meshing of the gear wheel 201 carried on the pivot 203 beneath the cylinder and meshing with said rack.

The gear wheel 201 just referred to when rotated will swing the cylinder and shovel in a horizontal plane and relatively to the truck. This gear wheel has formed integrally therewith a sprocket wheel 205, around which passes a chain 207, which chain also passes around the second sprocket wheel 209, carried on the shaft 211 supported by the bracket 212 at the side of the machine. The shaft 211 also carries a spur gear 213 connected to the sprocket 209 and which meshes with a pinion 215. The pinion is fixed to a shaft 217, carried on the bracket 219 at the side of the machine. At the upper end of the shaft 217 is a bevelled gear 221 meshing with a similar bevelled gear 223 which is adapted to be rotated by means of a crank 225. Rotation of the crank 225 in an obvious manner will act to turn the gear wheel 201 and by cooperation the rack will act to swing the shovel.

For permitting the wide swing of the shovel and for supporting the forward end of the cylinder member 11 when so swung I provide at opposite sides of the machine near its forward end arms 227 which carry rollers 229. The rollers 229 provide extensions of the set of rollers 187. The arms are hinged to the truck at 231 and each is held in extended position by means of a strut 233 secured to the arm at one end and at its other end to the eye bolt 235 removably secured to the truck. When working in narrow drifts, the eye-bolts may be detached and the arms 227 moved close to the side of the truck.

In the claims by "absolute motion" of the parts of the machine is meant motion relative to the ground assuming the machine is stationary relative to the ground.

Although I have described for purposes of illustration one specific embodiment of my invention, it is to be understood that I am not limited thereby to the particular details of this modification but that within the scope of my invention wide deviations may be made from such embodiment without departing from the spirit of my invention.

I claim:

1. A machine of the character described having, in combination, a pivoted shovel arm, a cooperating gear and rack for moving said arm, and means for moving said rack in one direction relative to said gear while withholding motion from said pivot and for moving said gear in the opposite direction relative to said rack for causing translation of said pivot and swinging of said arm about said pivot.

2. In a machine of the character described, a pivoted shovel arm, a gear and a cooperating rack for operating said arm, means for moving said pivot without swinging said arm to cause crowding of said shovel, means for lifting said shovel while holding said pivot stationary, and means for moving said pivot in a direction opposite to its first movement without moving said rack to cause dumping said shovel.

3. In a machine of the character described, shovel operating mechanism comprising a rack and a pivoted gear wheel meshing with said rack, said gear wheel and said rack each having a motion of translation, and means for successively giving each its motion of translation while withholding motion of translation of the other.

4. In a machine of the character described, shovel operating mechanism comprising a rack and a pivoted gear meshing with said rack, and means for reciprocating said rack while withholding motion from said pivot and for reciprocating said pivot while withholding motion from said rack.

5. In a machine of the character described, shovel operating mechanism comprising a pivoted arm, a bucket carried by said arm, means supporting the pivot of said arm for angular and translatory movement, means for giving angular movement to said arm about its pivot while withholding translatory movement, and means cooperating with said second named means for giving said pivot of said arm translatory movement to cause angular movement of said arm.

6. In a machine of the character described, shovel operating mechanism comprising a wheel or the like supported for angular and translatory motion, means having a motion of translation relative to said wheel and thereby giving angular motion to said wheel, means for causing translatory motion of said wheel relative to said means and thereby giving said wheel angular motion, and coaxially arranged pistons for actuating said means.

7. In a shoveling machine, a cylinder, a piston in said cylinder and having a chamber containing a second piston, a shovel carried by said cylinder, means for causing motion of said second piston relatively to the first piston to lift said shovel, and means for admitting motive fluid to said cylinder and said chamber.

8. In a shoveling machine, a shovel, nested cylinders and pistons, and means for causing relative motion of said cylinders and pistons to actuate said shovel.

9. In a shoveling machine, a cylinder, a shovel, operating mechanism for said shovel comprising an arm pivotally supported by said cylinder, a piston, means connecting said piston and arm and for turning the latter on its pivot, and means for causing said cylinder to move for turning said arm on its pivot.

10. In a shoveling machine, a movable cylinder, a shovel, operating mechanism for said shovel comprising an arm pivotally supported by said cylinder, a piston in said cylinder, means connecting said piston and arm for causing absolute motion of said piston relative to said cylinder to turn said arm on its pivot, fluid pressure means for giving said cylinder absolute motion relative to said piston for turning said arm on its pivot, and coordinated controlling means for securing said motions of said cylinder and piston.

11. In a shoveling machine, a shovel raising mechanism including a gear wheel and a rack meshing with said wheel, a reciprocatory piston for moving said rack, means for causing translation of said piston and thereby raising said shovel, and means for causing translation of said wheel and thereby raising said shovel.

12. In a shoveling machine, a cylinder, a piston in said cylinder and having a chamber, a second piston in said chamber, a gear wheel pivotally supported by said first named piston, a rack connected to said second named piston and meshing with said wheel; and means for moving said second named piston and thereby turning said wheel, and for moving said first named piston while holding said second piston stationary and thereby further turning said wheel.

13. In a shoveling machine, a shovel, a cylinder, a piston in said cylinder and having a chamber, a second piston in said chamber, a gear wheel pivotally supported by said first named piston and for operating said shovel, a rack connected to said second named piston and meshing with said wheel, means for moving said first and said second piston simultaneously for crowding said shovel, means for moving said second piston without moving said first named piston and thereby raising said shovel, means for moving said first named piston in a reverse direction without moving said second piston and thereby further raising said shovel, and means for moving said second piston in a reverse direction and thereby lowering said shovel.

14. In a shoveling machine, a cylinder, a piston, shovel operating mechanism connected to both said piston and said cylinder, means for moving said piston through part of its stroke for lifting said shovel and for moving said cylinder in the opposite direction a distance equal to the remainder of said stroke for further operation of said shovel.

15. In a shoveling machine, a shovel, means providing a plurality of coaxially arranged expansible chamber motors, means connecting each of said motors to said shovel, said last named means causing motion of one of said motors to impart partial operation to said shovel and movement of another of said motors in the opposite direction to said first motor to impart further operation to said shovel.

16. In a shoveling machine, a means providing a plurality of fluid pressure rams, a shovel arm arranged to be operated by said rams; control valve mechanism for causing one of said rams to be moved through part of its stroke and then to be held stationary, and for finally causing another of said rams to move in the reverse direction.

17. In a shoveling machine, a means providing a plurality of fluid pressure rams, a shovel arm arranged to be operated by said rams; control valve mechanism for causing a pair of said rams to move through equal distances to crowd said shovel, for then holding one ram of said pair stationary while moving the other of said pair, and for finally holding said other ram stationary and reversing the direction of movement of said one ram.

18. In a shoveling machine, a means providing a plurality of fluid pressure rams, a shovel arm arranged to be operated by said rams; control valve mechanism for causing firstly a pair of said rams to move simultaneously through equal distances to crowd said shovel, for secondly holding one of said pair stationary while moving the other of said pair, for thirdly holding said other of said pair stationary while returning said one of said pair, and for finally returning said other of said pair.

19. In a shoveling machine, a shovel, a plurality of members arranged to afford a pair of cylinders and cooperating pistons, means for causing relative motion of said members to actuate said shovel; and valve mechanism for firstly admitting motive fluid to an end of one cylinder, for secondly continuing said admission while admitting fluid to a corresponding end of another cylinder, and for thirdly, continuing the last named admission while exhausting the end of the first named cylinder.

20. In a shoveling machine, a shovel, a plurality of nested members arranged to afford a pair of cylinders and cooperating pistons, means for causing relative motion of said members to actuate said shovel; and valve mechanism for firstly admitting motive fluid to an end of one cylinder, for secondly continuing said admission while admitting fluid to a corresponding end of another cylinder, and for thirdly, continuing the last named admission while exhausting the end of the first named cylinder.

21. In a shoveling machine, a shovel, a plurality of members arranged to afford a pair of cylinders and cooperating pistons, means for causing relative motion of said members to actuate said shovel; and valve mechanism for firstly admitting motive fluid to an end of one cylinder, for secondly continuing said admission while admitting fluid to a corresponding end of another cylinder, for thirdly continuing the last named admission while exhausting the end of the first named cylinder, and fourthly exhausting said corresponding end while admitting fluid to the opposite end of said second named cylinder.

22. In a shoveling machine, a shovel, a plurality of members arranged to afford a pair of cylinders and cooperating pistons, means for causing relative motion of said members to actuate said shovel; and valve mechanism for firstly admitting motive fluid to an end of one cylinder, for secondly continuing said admission while admitting fluid to a corresponding end of another cylinder, for thirdly continuing the last named admission while exhausting the end of the first named cylinder, and fourthly exhausting said corresponding end of said second named cylinder.

23. In a shoveling machine, a shovel, a hopper, a reciprocating scoop for removing material from said hopper, means for reciprocating said scoop in said hopper and means for coordinately causing said shovel to place material in said hopper and said scoop to remove material from said hopper.

24. In a shoveling machine, a shovel, means forming a cylinder containing a pair of pistons, and means for causing motion of said pistons relatively to each other and to said cylinder to crowd and lift said shovel.

25. In a shoveling machine, a shovel, means forming a cylinder containing a pair of pistons, and means for initially causing a simultaneous motion of said pistons in the same direction for crowding said shovel, and for then causing said pistons to spread apart for lifting said shovel.

26. In a shoveling machine, a shovel, a fluid pressure operated expansible chamber type motor device comprising a cylinder having two pistons, a source of pressure fluid, controlling means for admitting said pressure fluid to opposite ends of said cylinder and between said pistons, and connections between said pistons and shovel for causing simultaneous movement of said pistons to crowd said shovel and spreading of said pistons to raise said shovel.

27. In a shoveling machine, a shovel, a fluid pressure operated expansible chamber type motor device for crowding said shovel into the work and for lifting said shovel, said motor device comprising a cylinder containing a pair of pistons, a source of pressure fluid, controlling means for admitting and exhausting said pressure fluid to and from opposite ends of said cylinder and between said pistons for causing motion of said pistons relatively to said cylinder and relative motion between said pistons, and shovel operating mechanism operated by said pistons.

28. In a shoveling machine, a shovel, a cylinder having a pair of pistons, and means connecting said shovel to both said pistons and whereby motion of either piston relatively to the other will raise said shovel.

29. In a shoveling machine, a shovel, a cylinder having a pair of pistons, means for causing movement of both of said pistons for crowding said shovel for then moving one piston in the same direction as crowding for partially raising said shovel and for then moving the other of said pistons in the opposite direction for further lifting said shovel.

30. In a shoveling machine, a shovel, a cylinder having a pair of pistons, shovel operating mechanism, and controlling means for causing motion of said pitons for actuating said shovel operating mechanism.

31. In a shoveling machine, a shovel, a hopper, a cylinder and piston, means for moving said cylinder and piston, means cooperating with said cylinder and piston and actuated by movement thereof for causing said shovel to lift and place material in said hopper, and means for causing said material to be removed from said hopper.

32. In a shoveling machine, a shovel, a hopper, a swinging shovel arm, mechanism including a reciprocating scoop for causing removal of material from said hopper, a cylinder member, a piston member, a rack connected to one of said members for operation thereby, a gear wheel meshing with said rack for operating said shovel arm, and a second gear wheel meshing with said rack for operating said mechanism.

33. In a shoveling machine, a swinging shovel, a hopper, means for removing material from said hopper, a rack, a gear wheel pivoted to said cylinder and meshing with said rack for operating said shovel, a second gear wheel meshing with said rack and for operating said means, a cylinder, a piston in said cylinder and connected to said rack, means for giving said cylinder and said piston absolute motion relatively to each other to cause relative motion between said rack and the pivot of said first mentioned gear wheel for swinging said shovel whereby it lifts and dumps material in said hopper and for moving said rack for actuating the means for removing the material from the hopper.

34. In a shoveling machine, a swinging arm, a shovel carried by said arm, a material conveyor comprising a receiver for material and an intermittently reciprocating scoop, means for causing said arm to be actuated to fill said shovel with material and to afterwards swing it to lift and dump said material on said conveyor, and means for automatically operating said scoop to cause it to remove said material from said conveyor before said bucket again dumps.

35. In a shoveling machine, a hopper, a reciprocating scoop in said hopper for removing material therefrom, a shovel, and means for actuating said shovel to place material in said hopper and for actuating said scoop to remove said material from said hopper.

36. In a shoveling machine, a hopper, a scoop, a shovel, means for actuating said shovel to place material in said hopper and for actuating said scoop to remove said material from said hopper, and means for rendering said scoop inoperative to remove said material.

37. In a shoveling machine comprising a swinging shovel arm, a plurality of nested cylinders and pistons for actuating said arm, a hopper positioned above said cylinders and pistons, and means for causing material to be removed from said hopper.

38. In a shoveling machine, a cylinder, a piston in said cylinder, a second piston in said first piston, a shovel, means for causing said shovel to be crowded, swung and returned in response to motion of said pistons, a hopper, positioned to receive the contents of said shovel and having an end at the rear of the machine, a scoop for said hopper, and means for causing the inward movement of said second piston to actuate said scoop whereby to remove the contents of said hopper and the outward movement to return said scoop.

39. In a shoveling machine, a cylinder, a piston in said cylinder, a second piston in said first named piston, a swinging shovel arm pivoted to said first named piston, a rack connected to said second piston, a gear wheel meshing with said rack and connected for swinging said arm, means for moving said pistons simultaneously for crowding said shovel, means for causing said second named piston to continue moving in the same direction, a stop cooperating with said rack for limiting the movement of said second piston, means causing said first piston to return after said second piston has been moved to its limit of motion, and for finally returning said second piston, a hopper positioned to receive the contents of said shovel, and a scoop actuated by said rack and caused to be moved to the receiving end of said hopper by outward movement of said rack and to be moved to discharge said hopper by inward movement of said rack.

40. In a shoveling machine, a hopper, a reciprocating scoop for removing material from said hopper, a tipple for said scoop when in its discharging position, a shovel for placing material in said hopper, and means for actuating said scoop automatically with said shovel.

41. In a shoveling machine, a shovel for scooping and shoveling material, a conveyor comprising a reciprocating scoop for receiving said material, means for causing said shovel and scoop to be operated together whereby said shovel may place material in said scoop and said scoop can move said material to the rear of said machine.

42. In a loading machine, a pivoted arm, a cam track on said arm and moving therewith, a cam follower movable relatively to said arm for cooperation with said track and arranged to swing said arm, and a shovel carried by an intermediate portion of said arm and having its scooping edge at a greater radial distance from the pivot of said arm than any portion of said cam track.

43. In a shoveling machine, a cylinder, a piston therein and having a chamber, a piston in said chamber, passages in the wall of said cylinder and leading to opposite ends thereof, passages leading to opposite ends of said chamber and formed in the walls of said first piston, other passages formed in the wall of said cylinder, and pipes received by said last named passages and communicating with the passages leading to said chamber.

44. In a shoveling machine, a scoop, means for moving said scoop, upper and lower stops for said scoop and arranged out of alignment, and spaced parts carried by said scoop and so positioned as to move against said stops at different times whereby said scoop is tilted.

In testimony whereof, I have signed my name to this specification.

GEO. H. GILMAN.